April 24, 1951          J. BORLAND          2,549,884
AXLE DRIVE CONSTRUCTION
Filed March 19, 1947                    5 Sheets-Sheet 1
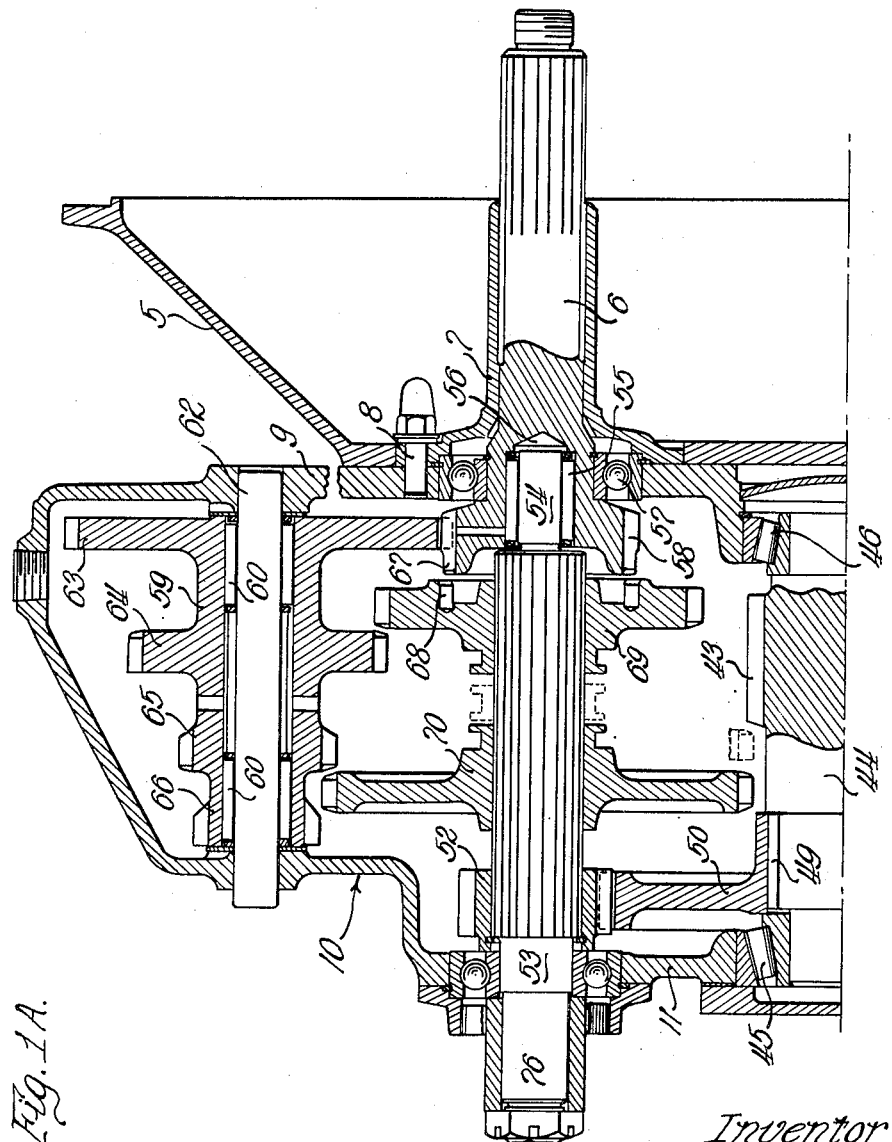
Fig. 1A.
Inventor:
John Borland
By Walter E. Schirmer
Atty.

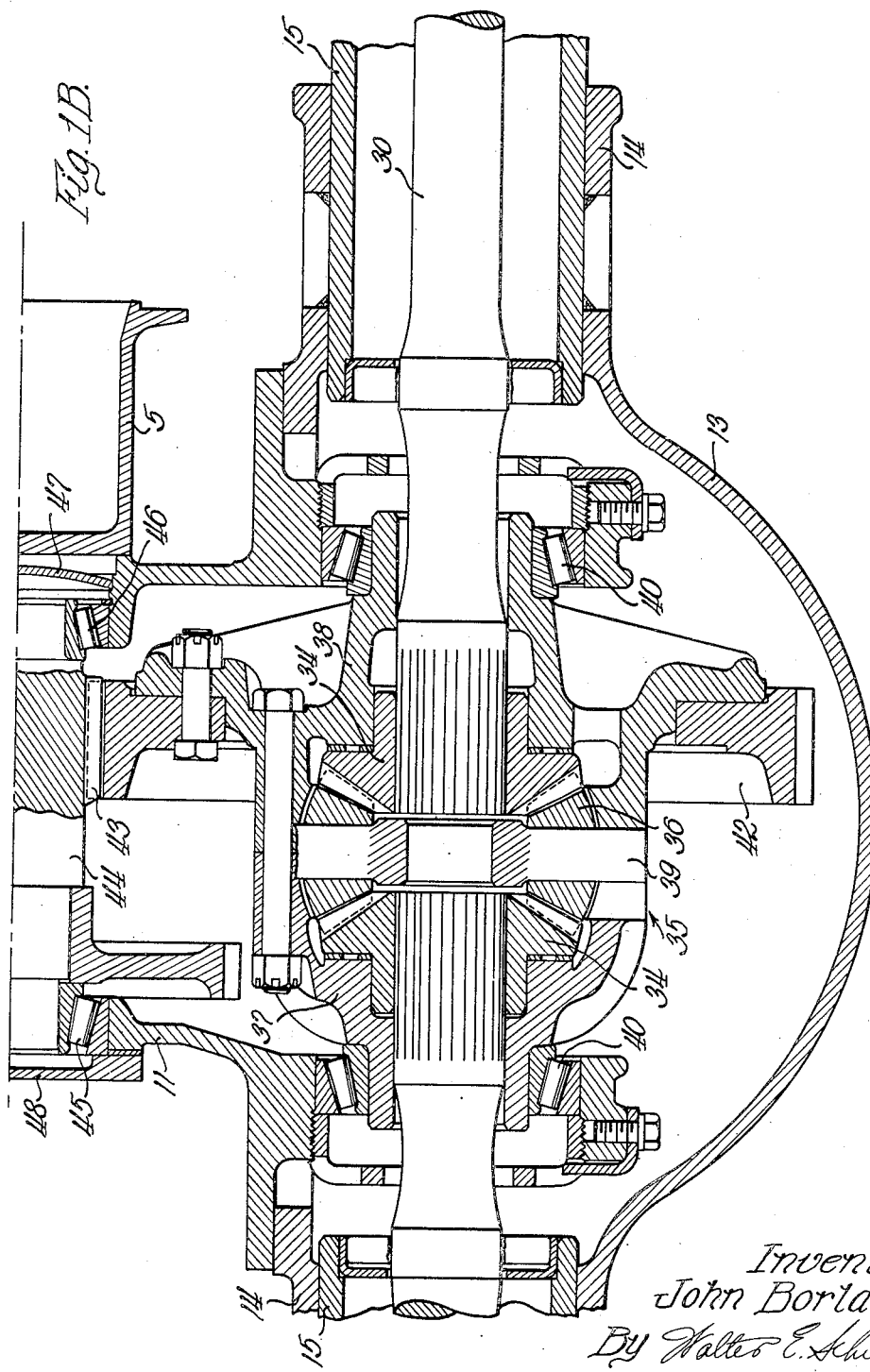

Inventor:
John Borland
By Walter E. Schirmer
Atty.

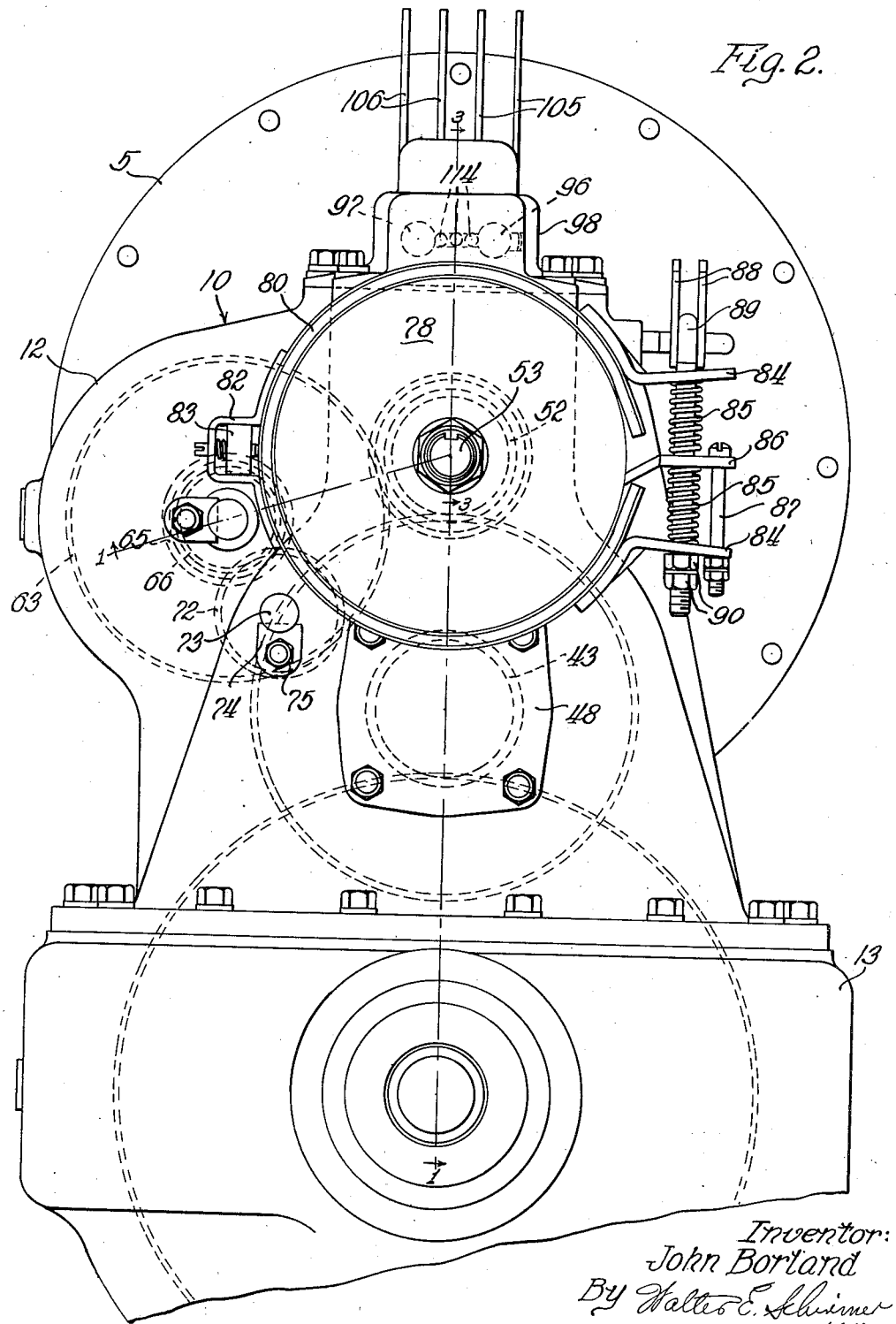

Patented Apr. 24, 1951

2,549,884

UNITED STATES PATENT OFFICE 2,549,884

AXLE DRIVE CONSTRUCTION

John Borland, Buchanan, Mich., assignor to Clark Equipment Company, Buchanan, Mich., a corporation of Michigan Application March 19, 1947, Serial No. 735,661

1 Claim. (Cl. 74—701)

This invention relates to axle drive construction and more particularly is directed to an axle drive construction for self-propelled agricultural implements, such as combines, harvesters, and the like.

The development of self-propelled combines, as an example of one type of vehicle with which the present invention may be used, has been relatively recent since up to a short time ago, most of these devices were propelled by a separate power source, such as a tractor or the like. However, it has been found desirable to provide combines where the implement itself is self-propelled so as to eliminate the use of a separate tractor and driver, and inasmuch as such combines are ordinarily provided with a motor for operating the combine mechanism, such motor can also be utilized for propelling the vehicle.

Axle drives previously developed for self-propelled vehicles of this type have been rather cumbersome and heavy, adding materially to the weight of the vehicle, as well as taking up an appreciable amount of space, thereby making the vehicle bulkier and heavier. It has been customary heretofore to provide an automotive type transmission driven through the conventional type of automotive clutch from the power source of the vehicle, which transmission, in turn, is bolted to an annular drive housing for transmitting the drive from the output shaft of the transmission and to a driving ring gear which, in turn, drives a pinion that again, in turn, drives the bevel gear of the differential of the axle.

It has also been customary, in previous designs, to provide a secondary reduction between the differential and the driving wheel by the use of an internal gear type reduction, such as was commonly known years ago in the automotive truck field. This type of construction, it will be readily apparent, introduces heavy castings, and additional weight, as well as taking up certain space requirements which are undesirable, and consequently adds to the cost of the unit, making such units prohibitive in use except in very large farming communities.

Another design which has been largely used in this field is a chain and sprocket drive to the traction wheels, which, however, because of exposed operation, is not generally satisfactory.

The present invention has for its primary object to obtain the desired reduction of speed through the axle drive, while yet utilizing, as far as possible, a light weight enclosed construction and also utilizing a more or less conventional automotive type wheel mounting in the ends of the axle shaft.

Another advantage of the present construction is its adaptability for use with existing designs of self-propelled vehicles, in that it can be connected to the motor of such vehicle through a V belt drive or the like, and in and of itself contains the desired gear reductions which have been found necessary for operations of these vehicles in various types of harvesting conditions.

A still further object of the present invention is to provide a construction of this type in which the wheel mounting at the end of the drive axle housing is such that it can be replaced by a crawler drive when desired, as for example when such vehicles are operated in the harvesting of rice.

Other objects and advantages of the present invention, such as the utilization of a single housing containing the speed reduction mechanism, the reversing mechanism and the differential driving mechanism, which lends simplicity and economy to the construction, will be more apparent to those skilled in the art from the following detailed description of the invention, which, taken in conjunction with the accompanying drawings, will disclose the particular construction and operation of this drive.

In the drawings:

Figures 1—A, 1—B, and 1—C constitute a composite sectional view of the drive axle construction taken substantially on line 1—1 of Figure 2, with certain portions broken away for purposes of clarity.

Figure 2 is a side elevational view of the construction shown in Figure 1; and

Figure 1C:
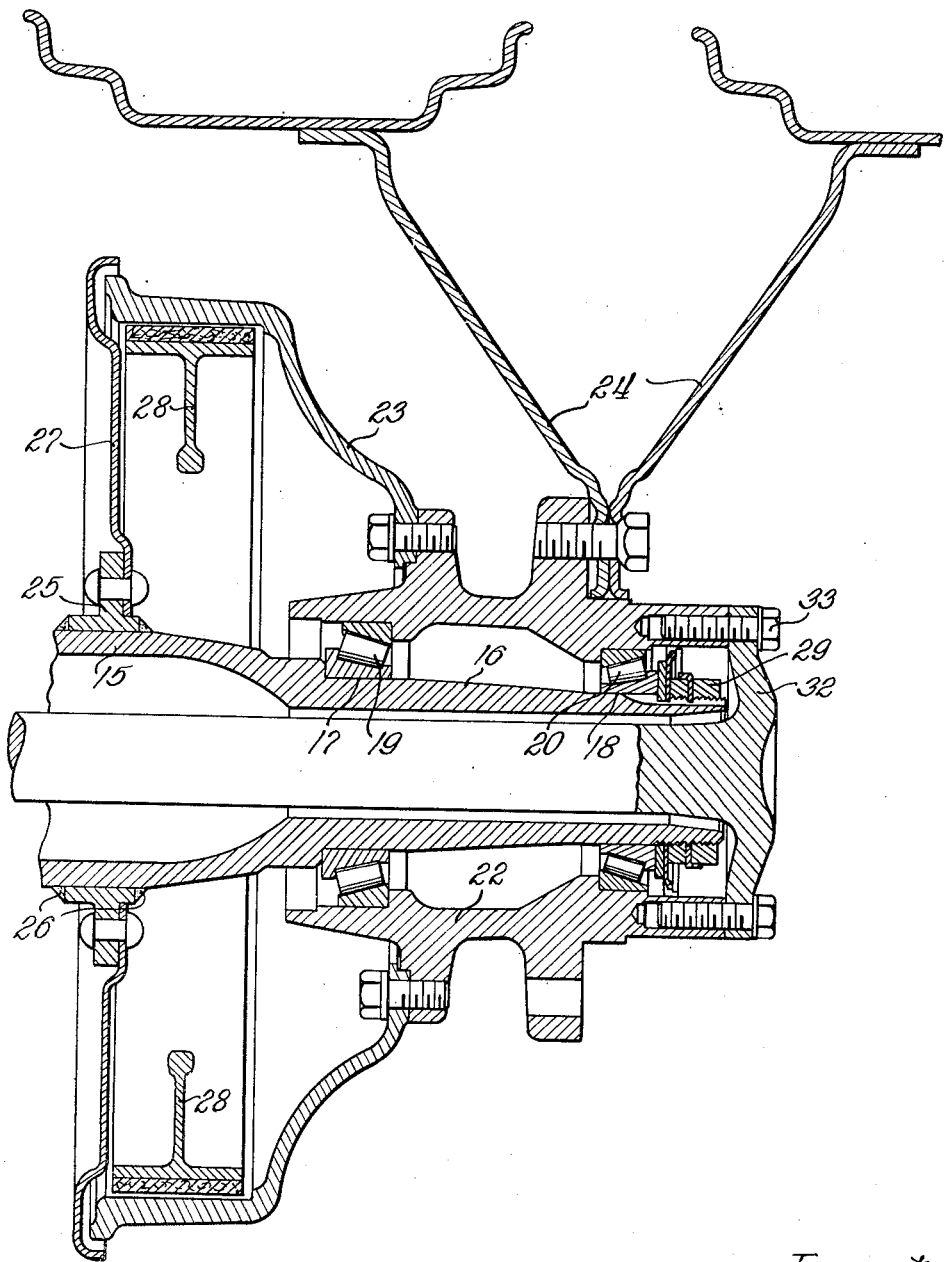

Referring now in detail to the drawings, there is provided a bell housing 5, which is adapted to receive the drive shaft of pinion shaft 6 of a clutch mechanism (not shown), which clutch mechanism in turn, couples the shaft 6 to the engine or other power source carried by the combine. The clutch bearing support sleeve 7, which encloses a portion of the clutch shaft 6, is adapted to be bolted by means of the cap screws 8 into one side wall 9 of a housing, indicated generally at 10, and the bell housing is correspondingly secured to the same side wall 9 of the housing 10.

The housing 10 is of the general shape shown in Figure 2, having a depending portion 12 and piloted on a forwardly extending banjo type housing portion 13, containing the differential of the driving axle. The banjo portion 13 of the housing is provided with laterally extending socket portions 14 into which are pressed tubular sleeve members 15, forming axle housing arms. The sleeve members 15 may be held or otherwise suitably fixed against movement within the socket portion 14 and at their outer extremities, are reduced, as indicated at 16, to provide bearing seats 17 and 18 for the bearing assemblies 19 and 20, respectively, upon which the wheel hub 22 is rotatably journalled. The wheel hub 22, in turn, is adapted to carry a brake drum 23, and the disc members 24 for supporting conventional types of pneumatic tired wheels.

Mounted on the housing arms, adjacent the reduced portion 16 thereof, are brake flanges 25, which may be welded in position on the arms, as indicated at 26, and are adapted to receive backing plates 27, carrying suitable brake shoe members 28 for co-action with the inner annular surface of the brake drum 23 to provide steering brakes for the vehicle.

The extreme end of the reduced portion of the sleeve 15 is threaded to receive the lock nuts 29, which hold the outer bearing 20 in position, and provide for adjustment of such bearing in the mounting of the hub 22 about the wheel spindle.

Extending through the tubular arms 15 are axle shafts 30, which, at their outer ends, are provided with radially flanged portions 32, adapted to receive the bolts 33 for securing the flange portion of the shaft to the hub 22, thereby securing the wheel hub and the associated discs for direct driving engagement with the axle shaft.

The inner ends of the axle shafts extend into the side gears 34 of the differential assembly, generally indicated at 35, which assembly includes the differential pinions 36, the differential case 37—38 and the associated cross member 39. This differential assembly 35, generally is similar to that used in automotive and truck construction and is adapted to be journalled by means of the bearings 40 in suitable journal brackets carried by the housing 10.

Mounted on the portion 38 of the differential case is the annular external gear 42 which may be bolted or riveted in place and which is adapted to have meshing engagement with the gear portion 43 of the shaft 44. The shaft 44, has its opposite ends reduced and journalled in tapered roller bearings 45 and 46, respectively, supported in the side walls 9 and 11 of the housing 10. The end of the shaft 44, adjacent the wall 9 of the housing, may be closed by means of a plug member 47, or may be left open and closed by the rear wall of the bell housing 5. The opposite end of the shaft 44 is closed by the bearing cap member 48.

The shaft 44 is provided with a reduced splined portion 49 upon which is non-rotatably mounted a gear 50 having the gear teeth thereof in constant meshing engagement with the pinion 52 mounted on the shaft 53. Thus it will be seen that the shaft 44 is driven at all times by the pinion 52 driving the gear 50 and that, in turn, the shaft 44 has constant driving engagement with the gear 42 carried on the differential case 35.

The shaft 53 is provided, at its right hand end, with a reduced portion 54 mounted by means of suitable roller bearings 55, within a recessed portion 56 of the clutch driving shaft 6. This shaft, in turn, is provided within the housing 10 with an annular portion upon which is mounted the ball bearing assembly 57 for supporting this end of the shaft in the wall 9 of the transmission housing, and is provided with the enlarged gear portion 58 having constant meshing engagement with a compound gear member 59 rotatably mounted as by means of rollers 60 upon the lay shaft 62, which is shown out of position in Figure 1—A, and is normally disposed in a position below the shaft 53 and slightly toward the shaft 44. It will be apparent that rotation of the shaft 6 consequently produces rotation of each of the gear portions 63, 64, 65, and 66 of the compound gear 59.

The gear portion 58 of the enlarged part of shaft 6 is also provided with a clutch tooth portion 67 disposed inwardly of the gear portion 58 and adapted to be engaged by the internal clutch tooth portion 68 of a sliding gear 69 mounted in splined engagement upon the shaft 53. Thus it will be apparent that when the gear 69 is shifted to the right, as viewed in Figure 1—A, it provides for coupling engagement between clutch tooth portions 67 and 68, thereby clutching shafts 6 and 53 together for conjoint rotation. Inasmuch as shaft 53 carries gear 52 thereon, in non-rotatable engagement, this provides for direct drive of the pinion 52 and consequently, as has been described heretofore, produces high speed drive of the differential assembly 35 through gear 50, 43, and 42.

When the sliding gear 69 is shifted to the left, as viewed in Figure 1—A, it moves into meshing engagement with the gear portion 64 of compound gear 59 and again produces rotation of shaft 53, but at a reduced speed. This rotation is produced by gear 63 being driven from the clutch shaft 6, and in turn, driving gear 64, which has been engaged by gear 69. This provides second speed drive to the differential assembly 35.

With the gear 69 in the neutral position shown in Figure 1—A low speed drive can be produced by shifting the sliding gear 70, splined on shaft 53, to the right, as viewed in Figure 1—A, thereby producing meshing engagement of this gear with gear portion 65 of gear 59, and consequently rotating shaft 53 at a speed less than that produced when gear 69 is clutched to gear 64. This provides for low speed drive to the differential, and it will thus be seen that the present construction provides for three gear ratios between the shaft 6, and the shaft 44 in a forward direction.

When it is desired to drive the vehicle in reverse, the gear 70 is shifted to the left, as viewed in Figure 1—A, and moves into meshing engagement with an idler gear 72, indicated in Figure 2, which idler gear, in turn, is mounted on an idler shaft 73, locked in position by the locking member 74 bolted to the side wall 11 of the housing 10 by means of the cap screws 75. The idler gear 72, in turn, is in constant meshing engagement with the gear portion 66 of compound gear 59 and consequently, operates to drive gear 70 in the reverse direction, thereby imparting reverse drive to the differential assembly 35 through pinion 52, gear 50, gear 43 and gear 42.

Figure 3:
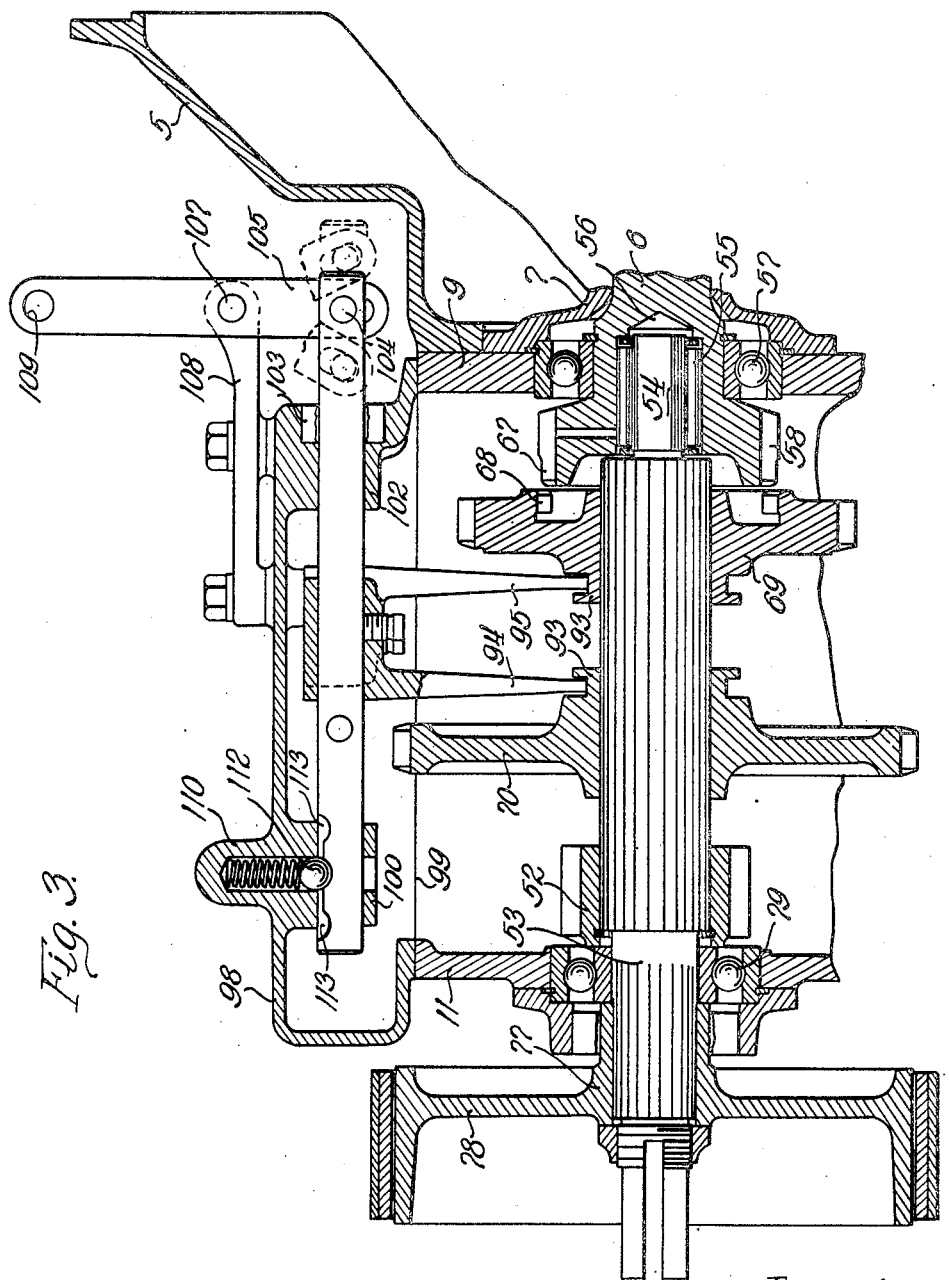
Figure 3 is a detailed sectional view taken substantially on line 3—3 of Figure 2.

The shaft 53 is adapted to have a projecting end 76 which, as shown clearly in Figure 3, is splined to receive the hub portion 77 of a brake drum member 78. The drum member 78 is thereby non-rotatably associated with the shaft 53 and is mounted closely adjacent the ball bearing assembly 79 which supports the left hand end of this shaft.

The brake drum 78 is adapted to be encircled by the brake band 80 which is anchored intermediate its ends by means of the bracket 82 mounted on the anchored support 83, which, in turn, is secured to the wall 11 of the housing 10, and at its opposite ends, is provided with extending ear portions 84 normally urged apart by means of the springs 85 which are seated at adjacent ends against an intermediate fixed support member 86. A suitable lock member 87 prevents the brake from rotating relative the support 86, and the brake is adapted to be energized by the cam members 88 which are connected to a J bolt 89, extending through the springs 85 and carrying lock nuts 90 on its lower end.

Since this brake mechanism forms no specific part of the present invention, it is not believed necessary to describe it in further detail.

In order to control the operation of the axle drive construction and to select the various speeds provided by this construction, each of the gears 69 and 70 is provided with an associated collar portion 93 forming an annular channel adapted to receive the cooperating portions of shift forks 94 and 95, respectively. These shift forks 94 and 95 are provided with collar portions whereby they are secured to individual shift rails 96 and 97 respectively, supported in a control cover member 98, which member is flanged as shown in Figure 2, and bolted about the opening 99 in the rear end of the housing 10.

The shift rails are supported in suitable boss portions 100 and 102 formed in the control cover 98 and project laterally therefrom through respective oil seals 103. The projecting ends of the shift rails are adapted to receive transverse pins 104, which are each engaged by a pair of control arms 105 and 106 respectively, the lower ends of these arms being provided with a longitudinal slot allowing them to drive the shift rails longitudinally when pivoted about their pivots 107, carried by the brackets 108, bolted to the outer surface of the control cover 98. The free ends of the arms 105 and 106 are provided with suitable openings 109 for reception of motion transmitting links or levers whereby they can be actuated by the operator of the vehicle.

The rear boss 100, which carries the shift rails 96 and 97, is provided with a projecting recessed portion 110, containing spring pressed ball members 112, each engaging one of the shift rails, whereby the rails are resiliently held in their various shifted positions. Suitable interlocked means, as shown in Figure 2, consisting of a plurality of ball members 114, control the shift rails to prevent operation of one rail unless the other rail is in neutral position, thus preventing clashing of gears within the gear trains in the drive.

It will thus be apparent that I have provided a novel type of axle drive construction for self-propelled agricultural implements, vehicles, and the like, in which a single unitary housing contains the various change speed gearing and differential mechanism for completing a drive from the clutch to the driving axle shaft, and in which all of the parts are located and arranged in a very compact and simplified manner reducing materially the size of the construction and also producing a material decrease in the weight of the drive axle.

I do not intend to be limited to the exact details of the construction herein shown, and described, but only as defined by the scope and spirit of the appended claim.

I claim:

In a self-propelled vehicle including a transverse axle housing having an enlarged differential receiving portion, a unitary housing adapted to be mounted on the axle housing, first, second, third, and fourth parallel shafts journaled in said unitary housing parallel to the axis of the axle housing, said first and second shafts and said axis of the axle housing lying in the same vertical plane, said third shaft being disposed laterally of said first and second shafts intermediate of horizontal planes passing through said first and second shafts, said fourth shaft being disposed intermediate vertical planes passing through said first and second shafts and said third shaft, said fourth shaft further being disposed intermediate horizontal planes passing through said second shaft and said third shaft, a differential mechanism disposed in the enlarged differential receiving portion of said axle housing, said differential mechanism being supported entirely by said unitary housing, and change speed gearing between said plurality of shafts and said differential mechanism.

JOHN BORLAND.

REFERENCES CITED

The following references are of record in the file of this patent:

UNITED STATES PATENTS

| Number | Name | Date |
|---|---|---|
| 1,511,156 | Bolgiano | Oct. 7, 1924 |
| 1,630,210 | Olson | May 24, 1927 |
| 1,678,447 | Schwenke | July 24, 1928 |
| 2,090,123 | Hoffman | Aug. 17, 1937 |
| 2,116,486 | Baker | May 3, 1938 |
| 2,183,667 | Buckendale | Dec. 19, 1939 |
| 2,306,545 | Kummich | Dec. 29, 1942 |
| 2,351,590 | Alden | June 20, 1944 |

FOREIGN PATENTS

| Number | Country | Date |
|---|---|---|
| 469,373 | Germany | Dec. 10, 1928 |
| 523,028 | France | Apr. 13, 1921 |